United States Patent
Chen et al.

(10) Patent No.: US 11,825,243 B2
(45) Date of Patent: Nov. 21, 2023

(54) PROJECTION APPARATUS AND CONTROL METHOD THEREOF

(71) Applicant: Coretronic Corporation, Hsin-Chu (TW)

(72) Inventors: Min-Hao Chen, Hsin-Chu (TW); Yi-Cheng Hou, Hsin-Chu (TW); Hao-Chang Tsao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/394,409

(22) Filed: Aug. 5, 2021

(65) Prior Publication Data

US 2022/0053173 A1 Feb. 17, 2022

(30) Foreign Application Priority Data

Aug. 12, 2020 (CN) .......................... 202010804829.2

(51) Int. Cl.
*H04N 9/31* (2006.01)

(52) U.S. Cl.
CPC ......... *H04N 9/3144* (2013.01); *H04N 9/3155* (2013.01); *H04N 9/3173* (2013.01)

(58) Field of Classification Search
CPC .. H04N 9/3144; H04N 9/3155; H04N 9/3173; H04N 9/3194; G03B 21/16; G03B 21/2053; G03B 21/2086
See application file for complete search history.

(56) References Cited

U.S. PATENT DOCUMENTS

| 7,553,028 B2 | 6/2009 | Engle et al. |
| 2003/0020884 A1 | 1/2003 | Okada et al. |

(Continued)

FOREIGN PATENT DOCUMENTS

| CN | 1989448 | 6/2007 |
| CN | 101071259 | 11/2007 |

(Continued)

OTHER PUBLICATIONS

"Partial Search Result of Europe Counterpart Application", dated Jan. 17, 2022, pp. 1-19.

(Continued)

*Primary Examiner* — Michael Lee
(74) *Attorney, Agent, or Firm* — JCIPRNET

(57) ABSTRACT

A projection apparatus and a control method thereof are provided. The projection apparatus includes a light source, an optical engine, a first sensor, and a processor. The light source provides a light beam to the optical engine. The optical engine converts the light beam into an image beam and projects the same out of the projection apparatus. The first sensor senses an ambient temperature. The processor is coupled to the optical engine, the light source, and the first sensor, records a projection time of the optical engine, selects a selected temperature range in which the ambient temperature is included from multiple temperature ranges according to the ambient temperature, and selects a selected driving program from multiple driving programs corresponding to the temperature ranges according to the selected temperature range to control the light source. A brightness of light beam is negatively related to the projection time.

16 Claims, 4 Drawing Sheets

(56) References Cited

U.S. PATENT DOCUMENTS

| | | | |
|---|---|---|---|
| 2006/0066816 A1* | 3/2006 | Horiguchi | H04N 9/3144 348/E5.143 |
| 2006/0279709 A1 | 12/2006 | Yamamoto | |
| 2007/0249396 A1 | 10/2007 | Nitta et al. | |
| 2008/0094579 A1 | 4/2008 | Fujinawa et al. | |
| 2008/0192210 A1 | 8/2008 | Ushiyama | |
| 2009/0040468 A1* | 2/2009 | Kameoka | G03B 21/16 353/52 |
| 2009/0244496 A1 | 10/2009 | Sugino et al. | |
| 2011/0128508 A1 | 6/2011 | Yamada et al. | |
| 2012/0075599 A1* | 3/2012 | Park | G03B 21/16 353/121 |
| 2012/0327379 A1* | 12/2012 | Enomoto | H04N 9/3161 353/52 |
| 2013/0107220 A1* | 5/2013 | Furukawa | H04N 9/3155 315/117 |
| 2013/0162917 A1* | 6/2013 | Sagawa | H04N 9/3144 349/5 |
| 2014/0049757 A1* | 2/2014 | Naitou | G03B 21/2053 353/121 |
| 2014/0146092 A1 | 5/2014 | Toyooka | |
| 2015/0103324 A1 | 4/2015 | Nakagomi et al. | |
| 2018/0146176 A1* | 5/2018 | Orlick | G02B 27/0025 |
| 2018/0252994 A1 | 9/2018 | Sato | |
| 2019/0331950 A1 | 10/2019 | Yoda | |
| 2019/0331957 A1* | 10/2019 | Aoki | H04N 9/3194 |
| 2020/0105231 A1* | 4/2020 | Higashiyama | B60K 37/02 |

FOREIGN PATENT DOCUMENTS

| | | |
|---|---|---|
| CN | 101290763 | 10/2008 |
| CN | 108073020 | 5/2018 |
| CN | 109899765 | 6/2019 |
| CN | 209460568 | 10/2019 |
| CN | 209590514 | 11/2019 |
| CN | 111149042 | 5/2020 |
| CN | 210465970 | 5/2020 |
| JP | H04319930 | 11/1992 |
| KR | 101003071 | 12/2010 |
| TW | 507096 | 10/2002 |
| WO | 2017114256 | 7/2017 |

OTHER PUBLICATIONS

"Office Action of China Counterpart Application", dated Sep. 27, 2022, p. 1-p. 9.

"Search Report of Europe Counterpart Application", dated Jun. 8, 2022, p. 1-p. 20.

* cited by examiner

PROJECTION APPARATUS AND CONTROL METHOD THEREOF

CROSS-REFERENCE TO RELATED APPLICATION

This application claims the priority benefit of China application serial no. 202010804829.2, filed on Aug. 12, 2020. The entirety of the above-mentioned patent application is hereby incorporated by reference herein and made a part of this specification.

BACKGROUND

Technical Field

The invention relates to an apparatus and a method, and particularly relates to a projection apparatus and a control method thereof.

Description of Related Art

Since projection apparatus is a high-power electronic apparatus, it may continuously accumulate heat during operation. If the projection apparatus is operated in a high-temperature environment, a closed environment or an environment with poor heat dissipation, besides aging of the projection apparatus is accelerated to reduce its service lifetime, the continuous accumulation of high temperature may cause safety problems of the projection apparatus. Therefore, it is necessary to improve the existing technology.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a projection apparatus and a control method of the projection apparatus, which are adapted to perform a corresponding projection operation according to an ambient temperature.

The invention provides a projection apparatus including a light source, an optical engine, a first sensor, and a processor. The light source provides a light beam to the optical engine. The optical engine converts the light beam into an image beam and projects the image beam out of the projection apparatus. The first sensor is configured to sense an ambient temperature. The processor is coupled to the optical engine, the light source and the first sensor. The processor records a projection time of the optical engine, and the processor selects a selected temperature range in which the ambient temperature is included from a plurality of temperature ranges according to the ambient temperature. The processor selects a selected driving program from a plurality of driving programs corresponding to the temperature ranges according to the selected temperature range to control the light source. According to the selected driving program, a brightness of the light beam provided by the light source is negatively related to the projection time.

The invention provides a control method of a projection apparatus including following steps. A first sensor is used to sense an ambient temperature. A processor is used to select a selected temperature range in which the ambient temperature is included from a plurality of temperature ranges according to the ambient temperature, and select a selected driving program from a plurality of driving programs corresponding to the temperature ranges according to the selected temperature range. The processor is used to control a light source according to the selected driving program, and record a projection time of the projection apparatus. According to the selected driving program, a brightness of the light beam provided by the light source is negatively related to the projection time.

Based on the above description, the projection apparatus and the control method of the projection apparatus may effectively perform corresponding projection operations according to the ambient temperature, so that the projection apparatus may effectively improve a service life and environmental safety.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described.

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1A:
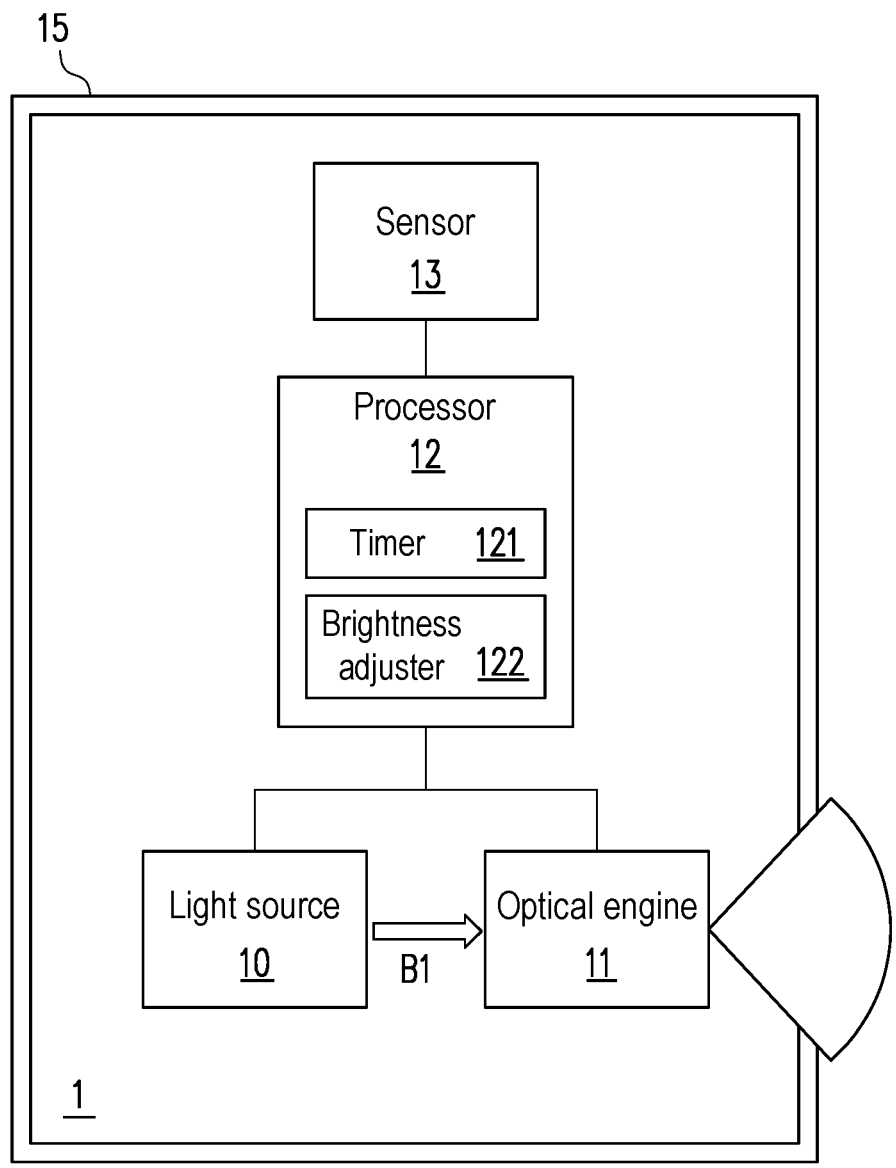
FIG. 1A is a schematic diagram of a projection apparatus according to an embodiment of the invention.

FIG. 1A is a schematic diagram of a projection apparatus 1 according to an embodiment of the invention. The projection apparatus 1 includes a light source 10, an optical engine 11, a processor 12 and a sensor 13. The light source 10 may provide a light beam B1 to the optical engine 11. The optical engine 11 receives the light beam B1, and converts the light beam B1 into an image beam (not numbered) and projects the image beam out of the projection apparatus 1. The sensor 13 is configured to sense an ambient temperature. The processor 12 is coupled to the light source 10, the optical engine 11 and the sensor 13. The processor 12 may record a projection time of the optical engine 11, and the processor 12 may select a selected temperature range in which the sensed ambient temperature is included from a plurality of temperature ranges according to the ambient temperature provided by the sensor 13. The processor 12 selects a selected driving program corresponding to the selected temperature range from a plurality of driving programs corresponding to the temperature ranges according to the selected temperature range to control an operation of the light source 10. In overall, the processor 12 in the projection apparatus 1 may control the operation of the light source 10 so that a light brightness provided by the light source 10 is negatively related to the projection time, i.e., as the projection time increases, the brightness of a light beam provided by the light source 10 may be gradually dimmed. In this way, when the projection apparatus 1 is initially started and the light source 10 is just turned on, the projection apparatus 1 may control the light source 10 to emit the light beam with a larger brightness. After the projection apparatus 1 has been started for a predetermined time, the projection apparatus 1 controls the light source 10 to emit the light beam with a smaller brightness, so as to provide a user with an optimized projection experience. In addition, the projection apparatus 1 may also select a suitable driving program according to the ambient temperature, so that the projection operation may adjust a projection brightness and the projection time according to the ambient temperature, thereby avoiding excessively long operating time of the projection apparatus 1 under severe conditions, and avoiding continuous accumulation of high temperature in an environment where the projection apparatus 1 is arranged, which effectively improves a service life and environmental safety of the projection apparatus 1.

For example, regarding an overall operation of the projection apparatus 1, the projection apparatus 1 may be installed in a mobile device. The projection apparatus 1 may operate according to an opening/closing signal provided by the mobile device. Specifically, in an embodiment, the mobile device may be a car, and the projection apparatus 1 may be a car welcoming projection apparatus, and the projection apparatus 1 may be installed in the car. The projection apparatus 1 may receive an opening/closing signal related to a car door opening/closing state, when the opening/closing signal indicates that the car door is opened, the projection apparatus performs a projection operation, for example, to project an image of a car brand or project an image of a special text or pattern. In the embodiment, since a position where the projection apparatus 1 is installed (inside the car) has a relatively high temperature, and a heat dissipation effect or means in a narrow and confined space is limited, the projection operation of the projection apparatus 1 in such harsh space often affects the service life of the projection apparatus 1 due to the high temperature, or makes the projection apparatus 1 unable to operate due to the high temperature, which spoils a user experience. Even more, the high temperature caused by the projection apparatus 1 is more likely to cause impact on environmental safety.

Therefore, the projection apparatus 1 may drive the sensor 13 to sense the ambient temperature when the car door is opened. The ambient temperature may be, for example, a temperature inside the projection apparatus or a temperature outside the projection apparatus, and a corresponding driving program is selected to perform projection according to the ambient temperature. In this way, the projection apparatus 1 may preferably select a suitable driving program according to the internal ambient temperature corresponding to a setting position of the projection apparatus 1, so as to use the driving program that fits the ambient temperature to perform projection, thereby avoiding excessively long operating time of the projection apparatus 1 under severe conditions, and avoiding continuous accumulation of high temperature in the environment where the projection apparatus 1 is arranged, which effectively improves a service life and environmental safety of the projection apparatus 1.

The light source 10 may provide the light beam B1, and may be controlled by the processor 12 to adjust the brightness of the provided light beam B1. The light source 10 includes a single or a plurality of light-emitting elements for simultaneously or separately emitting light to form the light beam B1. The light source 10 may include, for example, a bulb, a light emitting diode (LED), an excitation light source, a laser diode (LD) and other similar elements or a combination thereof.

The optical engine 11 may receive the light beam B1 from the light source 10 to convert the light beam B1 into an image beam and project the image beam out of the projection apparatus 1. For example, the optical engine 11 may perform digital light processing (DLP) on the light beam B1 to generate the image beam. The optical engine 11 may include, for example, an image generator, optical components, a control circuit, a digital micromirror device (DMD) and other similar components or a combination thereof.

The sensor 13 may sense the ambient temperature. Although not shown in FIG. 1A, the projection apparatus 1 may further include a housing 15. The light source 10, the optical engine 11 and the processor 12 may be arranged in the housing 15. In an embodiment, the ambient temperature sensed by the sensor 13 is the ambient temperature in the housing 15. However, the invention is not limited thereto. The sensor 13 may also sense a temperature on the housing 15 of the projection apparatus 1 to serve as the ambient temperature, or the sensor 13 may also be attached to the outside of the housing 15 to sense the ambient temperature outside the housing 15, which is also within the scope of the invention. The sensor 13 may include, for example, a contact temperature sensor, a bimetallic temperature sensor, a glass liquid temperature sensor, a pressure type temperature sensor, a resistance temperature detector (RTD), a thermistor temperature sensor and thermocouple temperature sensor, a non-contact temperature sensor, radiation temperature measuring instrument, an infrared sensor, a microwave temperature sensor, a thermocouple temperature sensor, a PN junction temperature sensor, an acoustic temperature sensor, an optical fiber temperature sensor, an analog integrated circuit temperature sensor, a digital integrated circuit temperature sensor and other similar components or a combination thereof.

The processor 12 is coupled to the light source 10, the optical engine 11 and the sensor 13. The processor 13 may receive the ambient temperature provided by the sensor 13 and look up a lookup table according to the ambient temperature. Regarding the method of obtaining the lookup table, the lookup table may be stored in the processor 12 itself, or stored in a memory (not shown in FIG. 1A) in the projection apparatus 1, or the processor 12 may be connected to a network, etc., to obtain the lookup table, the invention does not limit the manner that the processor 12 stores or obtains the lookup table. Further, the look up table may include the plurality of temperature ranges. The driving programs may be stored in the lookup table, and each driving program corresponds to a different temperature range. The processor 12 may select a temperature range in which the ambient temperature is included from the aforementioned multiple temperature ranges to serve as the selected temperature range. Correspondingly, the processor 12 may also select a driving program corresponding to the selected temperature range as the selected driving program, and control the light source 10 according to the selected driving program. Therefore, the processor 12 may preferably select an appropriate driving program to control the operation of the light source 10 according to the ambient temperature, so that the projection operation may be adjusted according to the ambient temperature, thereby extending the service life of the projection apparatus 1. In addition, in each of the driving programs, the brightness of the light beam provided by the light source 10 under control of the processor 12 is negatively related to the projection time. Therefore, the projection apparatus 1 may provide an optimized brightness control program to bring a better projection experience to the user.

The processor 12 may include, for example, a central processing unit (CPU), or other programmable general-purpose or special-purpose micro control unit (MCU), a microprocessor, a digital signal processor (DSP), a programmable controller, an application specific integrated circuit (ASIC), a graphics processing unit (GPU), an arithmetic logic unit (ALU), a complex programmable logic device (CPLD), a field programmable gate array (FPGA) or other similar components or a combination thereof.

Moreover, although not shown in FIG. 1A, the processor 12 may include a timer 121 and a brightness adjuster 122. The timer 121 may be used to calculate and record the projection time of the projection apparatus 1, so that the processor 12 may control the light source 10 in accordance with time information indicated in the selected driving program. The brightness adjuster 122 may be used to control the brightness of the light beam emitted by the light source 10, so that the processor 12 may control the light source 10 in accordance with brightness information indicated in the selected driving program. The timer 121 and the brightness adjuster 122 may be implemented by means of software program, firmware language or hardware framework, which is not limited by the invention.

Figure 1B:
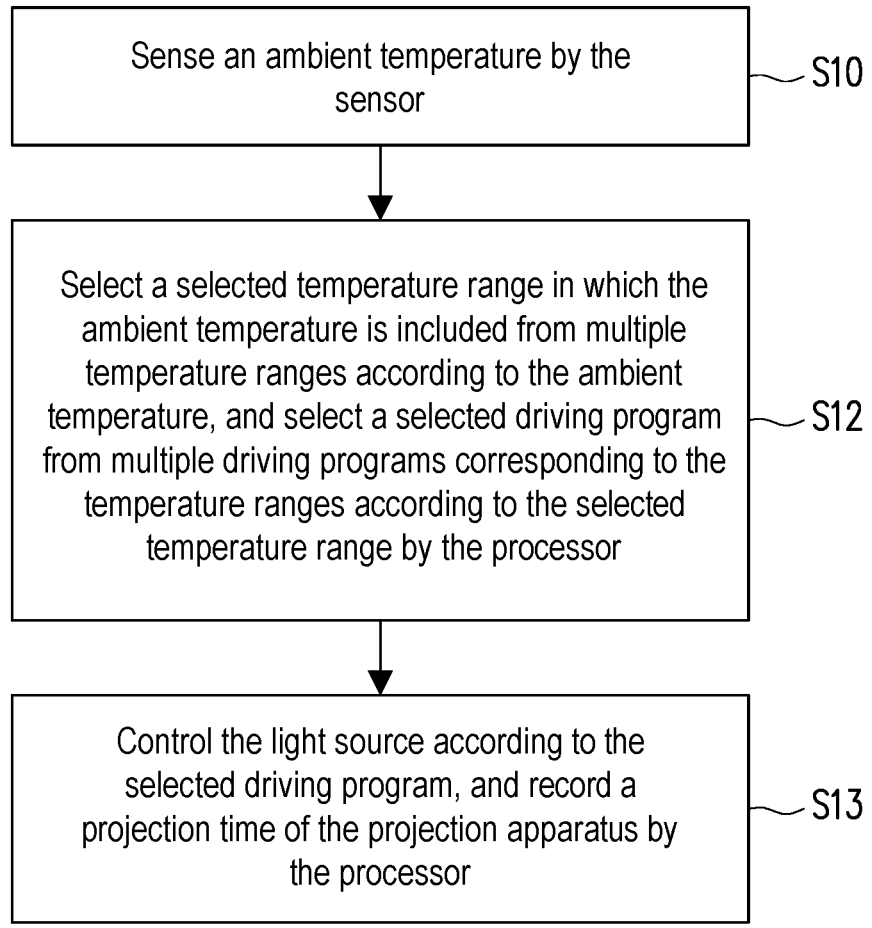
FIG. 1B is a schematic diagram of a control method according to an embodiment of the invention.

FIG. 1B is a control method of a projection apparatus according to an embodiment of the invention. Generally, the control method shown in FIG. 1B may be applied to the projection apparatus shown in FIG. 1A, and the aforementioned operation of the projection apparatus 1 may be summarized as the control method shown in FIG. 1B.

The control method shown in FIG. 1B may include steps S10, S12 and S13.

In step S10, a sensor is used to sense an ambient temperature.

In an embodiment, the sensor 13 may continuously sense the ambient temperature of the projection apparatus 1. In an embodiment, when the projection apparatus 1 is installed in a mobile device, the projection apparatus 1 may determine whether to operate according to an opening/closing signal of the mobile device. When the processor 12 of the projection apparatus 1 receives the opening/closing signal indicating that the mobile device is in the opening state, the processor 12 instructs the sensor 13 to sense the ambient temperature.

In step S12, a processor is used to select a selected temperature range in which the ambient temperature is included from a plurality of temperature ranges according to the ambient temperature, and select a selected driving program from a plurality of driving programs corresponding to the plurality of temperature ranges according to the selected temperature range.

In an embodiment, after the processor 12 obtains the ambient temperature sensed by the sensor 13, the processor 12 may look up the lookup table according to the ambient temperature to determine the driving program suitable for the ambient temperature. The lookup table looked up by the processor 12 may be, for example, a following table 1:

TABLE 1

| Temperature range | 0-60 seconds | 60-120 seconds | 120-180 seconds | 180-600 seconds | After 600 seconds |
|---|---|---|---|---|---|
| −10° C.-30° C. | 2 W | 1.5 W | 1 W | 1 W | 1 W |
| 30° C.-40° C. | 2 W | 1 W | 0.5 W | 0.5 W | 0 W |
| 40° C.-50° C. | 2 W | 1 W | 0.5 W | 0 W | 0 W |
| ... | ... | ... | ... | ... | ... |
| 80° C.-90° C. | 0.5 W | 0 W | 0 W | 0 W | 0 W |

The table 1 records a plurality of temperature ranges, where each temperature range corresponds to an individual driving program, and records relationships between time and powers of the light source 10, and the individual driving program corresponds to a predetermined operating time of the light source 10. Therefore, the processor 12 may determine the temperature range in which the ambient temperature is included, and then select the corresponding driving program. In detail, with regard to a relationship between the brightness information and the time information recorded in the individual driving program, the brightness of the light beam emitted by the light source 10 is gradually decreased as time increases. Taking the temperature range of 40° C.-50° C. as an example, in the time interval of 0-60 seconds, the processor 12 controls the light source 10 to provide the light beam with the corresponding brightness at 2 W (watts). In the time interval of 60-120 seconds, the processor 12 controls the light source 10 to provide the light beam with the corresponding brightness at 1 W. In the time interval of 120-180 seconds, the processor 12 controls the light source 10 to provide the light beam with the corresponding brightness at 0.5 W. In the time interval after the predetermined operating time of 180 seconds, the processor 12 may control the light source 10 to turn off to end the projection operation, where the predetermined operating time of the light source 10 corresponding to the selected driving program is equal to a sum of the time interval (for example, 0-60 seconds), the time interval (for example, 60-120 seconds), and the time interval (for example, 120-180 seconds). In this way, through the negative correlation between brightness and time, the projection apparatus 1 may provide the user with a better projection experience through optimized brightness.

Then, with regard to all of the driving programs in the table 1, as the temperature of the temperature range increases, the brightness of the light beam provided by the light source 10 under control of the processor 12 is negatively related to the temperatures of the temperature ranges. As a result, when the ambient temperature rises, the projection apparatus 1 may preferably select a suitable driving program according to the ambient temperature set by the projection apparatus 1 to reduce the projection brightness and projection time, thereby avoiding an excessively long operating time of the projection apparatus 1 under severe conditions and avoiding accumulation of excessive heat energy, so that the service life and environmental safety of the projection apparatus 1 are effectively improved.

In another embodiment, the lookup table obtained by the processor 12 may be, for example, a following table 2:

TABLE 2

| Temperature range | 0-60 seconds | 60-120 seconds | 120-180 seconds | 180-600 seconds | After 600 seconds |
|---|---|---|---|---|---|
| Below −10° C. | 0 W | 0 W | 0 W | 0 W | 0 W |
| −10° C.-30° C. | 2 W | 1.5 W | 1 W | 1 W | 1 W |
| 30° C.-40° C. | 2 W | 1 W | 0.5 W | 0.5 W | 0 W |
| 40° C.-50° C. | 2 W | 1 W | 0.5 W | 0 W | 0 W |
| ... | ... | ... | ... | ... | ... |
| 80° C.-90° C. | 0.5 W | 0 W | 0 W | 0 W | 0 W |
| Above 90° C. | 0 W | 0 W | 0 W | 0 W | 0 W |

The content of the table 2 is similar to that of the table 1, and a difference there between is that the table 2 further includes temperature ranges below −10° C. and above 90° C. In the embodiment, the lookup table 2 may include a first temperature (for example, −10° C.) and a second temperature (for example, 90° C.), and a plurality of temperature ranges may be included between the first temperature and the second temperature in the lookup table. Regarding each temperature range between the first temperature and the second temperature, the projection brightness thereof is negatively related to the ambient temperature, and the projection brightness is negatively related to the projection time. When the ambient temperature falls within the temperature ranges between the first temperature and the second temperature, the processor 12 may control the light source 10 to perform a corresponding projection operation according to the driving program indicated by the lookup table. When the ambient temperature falls out of the temperature ranges between the first temperature and the second temperature, i.e., when the processor 12 determines that the ambient temperature is less than the first temperature or the ambient temperature is greater than the second temperature, the processor 12 may control the light source 10 to turn off or not to turn on according to the driving program indicated by the lookup table. In this way, when the processor 12 determines that the ambient temperature is bad for the projection apparatus 1 and is not suitable for projection, the processor 12 may control the light source 10 to turn off without performing the projection operation according to the lookup table and the ambient temperature, so as to avoid operation in harsh environments that shortens the service life of the projection apparatus 1.

In step S13, the processor is used to control the light source according to the selected driving program, and record a projection time of the projection apparatus. In this way, the processor 12 may control the light source 10 according to the recorded projection time and the driving program obtained through table lookup. In each driving program shown in the above table 1, the light brightness of the light source 10 is negatively related to a time length of the projection time, so that the processor 12 may control the brightness of the light source 10 to perform the projection operation that the projection brightness is gradually reduced as the projection time increases. Therefore, the projection apparatus 1 may provide an optimized brightness control program, which brings a better projection experience to the user.

Figure 2A:
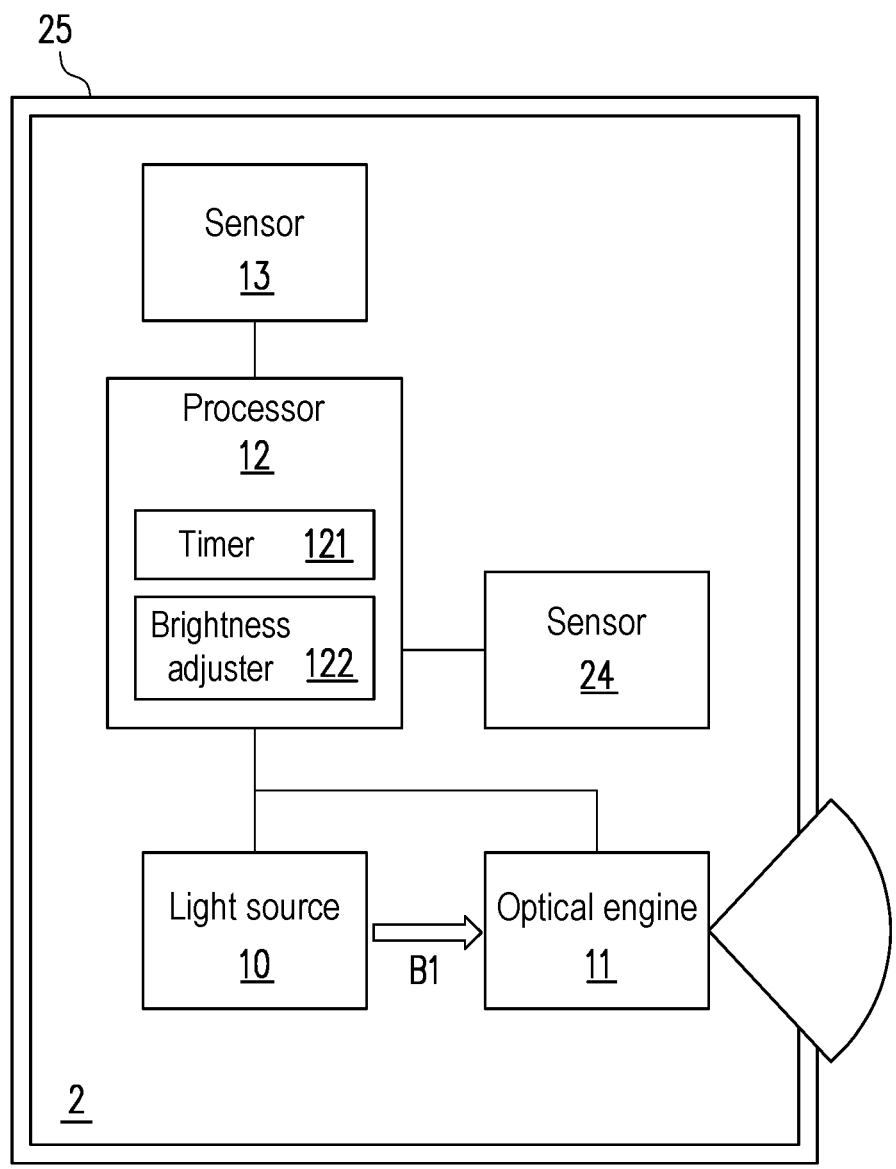
FIG. 2A is a schematic diagram of a projection apparatus according to an embodiment of the invention.

FIG. 2A is a schematic diagram of a projection apparatus 2 according to an embodiment of the invention. The projection apparatus 2 includes the light source 10, the optical engine 11, the processor 12, the sensor 13 (for example, a first sensor), and a sensor 24 (for example, a second sensor). Regarding descriptions of the light source 10, the optical engine 11, the processor 12, and the sensor 13, reference may be made to the related descriptions of FIG. 1A and FIG. 1B, which are not repeated. A difference between the projection apparatus 2 and the projection apparatus 1 is that the projection apparatus 2 is further provided with another sensor 24.

The sensor 24 is coupled to the processor 12, and the sensor 24 may be disposed adjacent to the optical engine 11 to sense a component temperature of the optical engine 11 and provide the component temperature to the processor 12. More specifically, the sensor 24 may be disposed adjacent to an image generator (for example, a digital micromirror device) in the optical engine 11. In an embodiment, the sensor 24 may be attached to the optical engine 11. In an embodiment, a distance between the sensor 24 and the image generator in the optical engine 11 may be less than a first predetermined distance (for example, less than 1 cm, 3 cm, 5 cm, etc.). Comparatively, the sensor 13 may be arranged in a housing 25, on the housing 25 or outside the housing 25 of the projection apparatus 2 to better sense the ambient temperature of a region where the projection apparatus 2 is arranged. In an embodiment, a distance between the sensor 13 and the image generator in the optical engine 11 may be greater than a second predetermined distance (for example, greater than 3 cm, 5 cm, 10 cm, 20 cm, etc.). Therefore, the sensor 24 may provide the component temperature related to the image generator in the optical engine 11 to the processor 12, so that the processor 12 may further perform the projection operation according to the component temperature provided by the sensor 24.

In detail, in detail, the processor 12 in the projection apparatus 2 is simultaneously coupled to the sensors 13 and 24. The processor 12 may simultaneously receive the ambient temperature provided by the sensor 13 and the component temperature provided by the sensor 24. Therefore, when the projection apparatus 2 executes the control method shown in FIG. 1B, in addition to obtaining the ambient temperature to determine the selected driving program according to the ambient temperature, and performing the projection operation based on the selected driving program in steps S10, S12, and S13, the projection apparatus 2 may also control the projection operation according to the component temperature provided by the sensor 24.

Figure 2B:
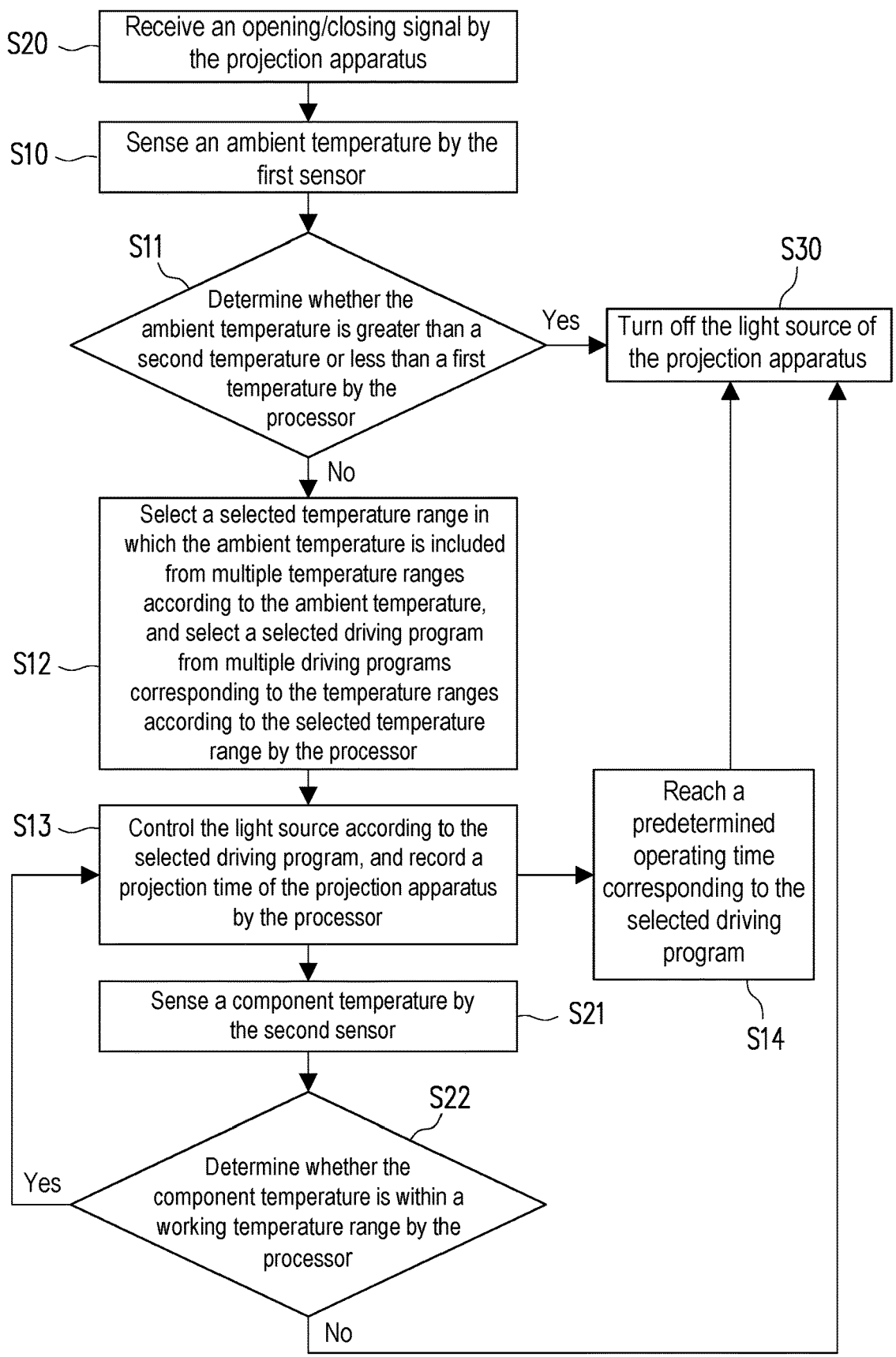
FIG. 2B is a schematic diagram of a control method according to the embodiment of the invention.

FIG. 2B is another control method of the projection apparatus according to the embodiment of the invention. Generally, the control method shown in FIG. 2B may be applied to the projection apparatus shown in FIG. 2A, and the aforementioned operations of the projection apparatus 2 may be summarized as the control method shown in FIG. 2B. To be specific, the control method shown in FIG. 2B includes steps S10, S11, S12, S13, S14, S20, S21, S22, and S30. In step S20, an opening/closing signal is received by the projection apparatus. In an embodiment, when the projection apparatus 2 is installed in a mobile device, the projection apparatus 2 may determine whether to operate according to the opening/closing signal of the mobile device. For example, when the mobile device is a car, opening or closing state of the car door may correspondingly generate an opening/closing signal. When the projection apparatus 2 receives the opening/closing signal of the mobile device, step S10 is executed to sense the ambient temperature by the first sensor. When the processor 12 receives the ambient temperature from the first sensor 13, step S11 is executed, and the processor 12 determines whether the ambient temperature is greater than the second temperature or less than the first temperature. When the ambient temperature falls within a temperature range between the first temperature and the second temperature, the processor 12 may control the light source 10 to perform a corresponding projection operation, i.e., execute step S12. When the ambient temperature exceeds the temperature range between the first temperature and the second temperature, i.e., when the processor 12 determines that the ambient temperature is less than the first temperature or the ambient temperature is greater than the second temperature, the processor 12 may control the light source 10 to turn off, i.e., execute step S30 to turn off the light source of the projection apparatus.

When the ambient temperature falls within the temperature range between the first temperature and the second temperature, the processor 12 may control the light source 10 to normally perform control procedures of steps S12 and S13, where when step S13 is executed, step S21 may be executed, by which a second sensor is used to sense a component temperature. When the processor 12 receives the component temperature from the second sensor 24, step S22 is executed, by which the processor determines whether the component temperature is within a working temperature range. When the processor 12 determines that the component temperature falls within the working temperature range, the processor 12 may control the light source 10 to perform step S13, i.e., the processor 12 continues to control the brightness and the operating time of the light source 10 according to the selected driving program. When the processor 12 determines that the component temperature falls outside the working temperature range (for example, when the processor 12 determines that the component temperature is greater than 100° C.), the processor 12 may turn off the light source 10 to stop or pause the projection operation of the projection apparatus 2, i.e., step S30 is executed. When step S13 is executed, step S14 is continued, by which when the processor 12 determines that the corresponding predetermined operating time is reached according to the selected driving program, step S30 is executed to turn off the light source. In brief, in addition to looking up the lookup table according to the ambient temperature to determine the corresponding driving program to perform the projection operation, the projection apparatus 2 may also perform the projection operation based on the component temperature.

In summary, the projection apparatus and the control method of the projection apparatus of the invention may provide users with optimized projection experience. In addition, the projection apparatus selects a suitable driver according to the ambient temperature, so that the projection operation may adjust the projection brightness and the projection time according to the ambient temperature, thereby avoiding excessively long operating time of the projection apparatus under harsh conditions and avoiding continuous accumulation of high temperature in the environment where the projection apparatus is arranged, which effectively improves the service life and environmental safety of the projection apparatus.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents. Moreover, any embodiment of or the claims of the invention is unnecessary to implement all advantages or features disclosed by the invention. Moreover, the abstract and the name of the invention are only used to assist patent searching. Moreover, "first", "second", etc. mentioned in the specification and the claims are merely used to name the elements and should not be regarded as limiting the upper or lower bound of the number of the components/devices.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising a light source, an optical engine, a first sensor, and a processor, wherein:
    the light source provides a light beam to the optical engine;
    the optical engine converts the light beam into an image beam and projects the image beam out of the projection apparatus;
    the first sensor is configured to sense an ambient temperature; and
    the processor is coupled to the optical engine, the light source, and the first sensor, the processor records a projection time of the optical engine, and the processor selects a selected temperature range in which the ambient temperature is included from a plurality of temperature ranges according to the ambient temperature, and the processor selects a selected driving program from a plurality of driving programs corresponding to the plurality of temperature ranges according to the selected temperature range to control the light source,
wherein according to the selected driving program, a brightness of the light beam provided by the light source is negatively related to the projection time,
wherein the processor controls the brightness of the light beam provided by the light source in a first time interval to be greater than the brightness of the light beam provided by the light source in a second time interval according to the selected driving program, and the first time interval is earlier than the second time interval,
wherein the processor controls the light source to turn off after a predetermined operating time according to the selected driving program, and the predetermined operating time is equal to a sum of the first time interval and the second time interval,
each of the plurality of driving programs corresponds to a predetermined operating time of the light source, and the processor controls the light source to turn off after the predetermined operating time of the light source is reached.

2. The projection apparatus as claimed in claim 1, further comprising a housing, wherein the optical engine, the light source, and the processor are disposed in the housing, and the first sensor is configured to sense the ambient temperature in the housing.

3. The projection apparatus as claimed in claim 1, wherein according to the plurality of driving programs, the brightness of the light beam provided by the light source is negatively related to temperatures of the plurality of temperature ranges.

4. The projection apparatus as claimed in claim 1, wherein the plurality of temperature ranges are between a first temperature and a second temperature, the first temperature is less than the second temperature, and when the processor determines that the ambient temperature is less than the first temperature or greater than the second temperature, the processor controls the light source to turn off.

5. The projection apparatus as claimed in claim 1, further comprising a second sensor disposed on the optical engine, and the second sensor sensing a component temperature of the optical engine,
wherein when the processor determines that the component temperature is outside a working temperature range, the processor controls the light source to turn off.

6. The projection apparatus as claimed in claim 5, wherein the optical engine comprises an image generator, and the second sensor is disposed beside the image generator of the optical engine and is configured to sense the component temperature of the image generator.

7. The projection apparatus as claimed in claim 1, wherein the processor further comprises a timer and a brightness adjuster, the timer calculates and records the projection time, and the brightness adjuster controls the brightness of the light beam provided by the light source.

8. A control method of a projection apparatus, wherein the projection apparatus comprises a light source, an optical engine, a first sensor, and a processor, the control method of the projection apparatus comprising:
sensing an ambient temperature by the first sensor;
selecting a selected temperature range in which the ambient temperature is included from a plurality of temperature ranges according to the ambient temperature, and selecting a selected driving program from a plurality of driving programs corresponding to the plurality of temperature ranges according to the selected temperature range by the processor; and
controlling the light source according to the selected driving program, and record a projection time of the projection apparatus by the processor,
wherein according to the selected driving program, a brightness of the light beam provided by the light source is negatively related to the projection time,
wherein the processor is used to control the brightness of the light beam provided by the light source in a first time interval to be greater than the brightness of the light beam provided by the light source in a second time interval according to the selected driving program, and the first time interval is earlier than the second time interval,
wherein the processor is used to control the light source to turn off after a predetermined operating time according to the selected driving program, and the predetermined operating time is equal to a sum of the first time interval and the second time interval,
each of the plurality of driving programs corresponds to a predetermined operating time of the light source, and the processor controls the light source to turn off after the predetermined operating time of the light source is reached.

9. The control method of the projection apparatus as claimed in claim 8, wherein the first sensor is used to sense the ambient temperature in a housing of the projection apparatus.

10. The control method of the projection apparatus as claimed in claim 8, wherein the processor is used to control the brightness of the light beam provided by the light source to be negatively related to temperatures of the plurality of temperature ranges according to the plurality of driving programs.

11. The control method of the projection apparatus as claimed in claim 8, wherein the plurality of temperature ranges are between a first temperature and a second temperature, the first temperature is less than the second temperature, and when the processor is used to determine that the ambient temperature is less than the first temperature or greater than the second temperature, the processor is used to control the light source to turn off.

12. The control method of the projection apparatus as claimed in claim 8, further comprising:
sensing a component temperature of the optical engine by a second sensor, wherein the second sensor is disposed on the optical engine; and
controlling the light source to turn off when the component temperature is outside a working temperature range by the processor.

13. The control method of the projection apparatus as claimed in claim 12, further comprising:
sensing the component temperature of an image generator of the optical engine by the second sensor, wherein the second sensor is disposed beside the image generator of the optical engine.

14. The control method of the projection apparatus as claimed in claim 8, further comprising:
calculating and record the projection time by a timer of the processor; and
controlling an input power provided to the light source by a brightness adjuster of the processor, so as to adjust the brightness of the light beam of the light source.

15. The control method of the projection apparatus as claimed in claim 8, further comprising:
starting to sense the ambient temperature by the first sensor according to an opening/closing signal received by the projection apparatus.

16. A projection apparatus, comprising a light source, an optical engine, a first sensor, and a processor, wherein:
- the light source provides a light beam to the optical engine;
- the optical engine converts the light beam into an image beam and projects the image beam out of the projection apparatus;
- the first sensor is configured to sense an ambient temperature; and
- the processor is coupled to the optical engine, the light source, and the first sensor, the processor records a projection time of the optical engine, and the processor selects a selected temperature range in which the ambient temperature is included from a plurality of temperature ranges according to the ambient temperature, and the processor selects a selected driving program from a plurality of driving programs corresponding to the plurality of temperature ranges according to the selected temperature range to control the light source, wherein according to the selected driving program, a brightness of the light beam provided by the light source is negatively related to the projection time, wherein the projection apparatus is arranged in a mobile device, the projection apparatus controls the first sensor to start sensing the ambient temperature and performing projection according to an opening/closing signal of the mobile device, and the ambient temperature sensed by the first sensor is related to a location where the projection apparatus is arranged in the mobile device, each of the plurality of driving programs corresponds to a predetermined operating time of the light source, and the processor controls the light source to turn off after the predetermined operating time of the light source is reached.

* * * * *